Jan. 1, 1963 R. L. LAYBURN 3,071,653
POWER SUPPLY SYSTEM
Filed July 16, 1958
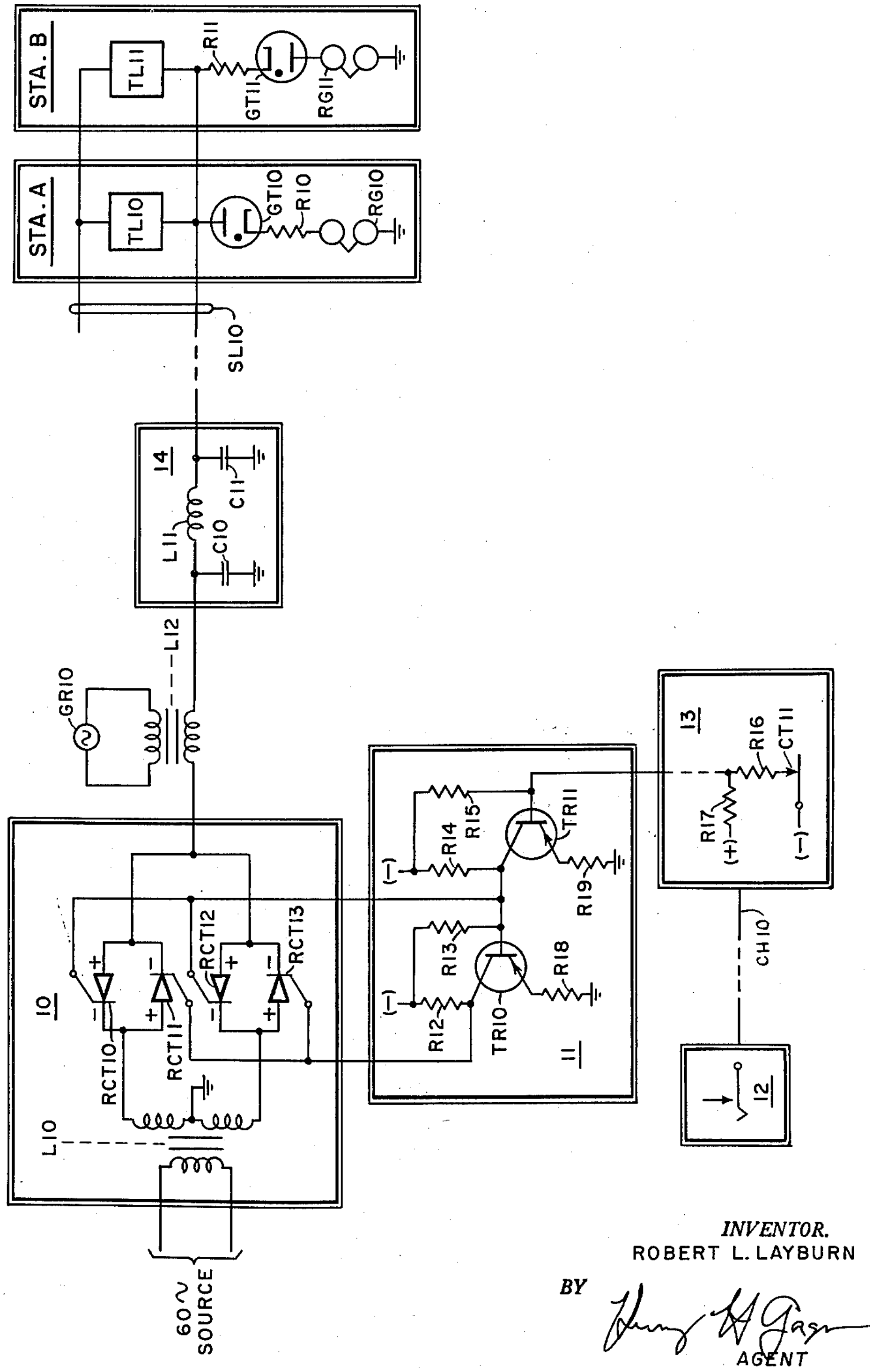
INVENTOR.
ROBERT L. LAYBURN
BY [signature]
AGENT United States Patent Office 3,071,653

Patented Jan. 1, 1963

3,071,653
POWER SUPPLY SYSTEM

Robert L. Layburn, Rochester, N.Y., assignor to General Dynamics Corporation, Rochester, N.Y., a corporation of Delaware Filed July 16, 1958, Ser. No. 748,948
3 Claims. (Cl. 179—86)

My invention relates to power supply systems in general and, more particularly, to power supply systems for use within telephone systems.

It has been the practice to provide telephone lines with subscriber stations connected across the line at various points. Each station is equipped with an alternating current responsive ringer or other signaling device connected between one of the line conductors and ground. In order to provide selective signaling when two stations have ringers connected to the same side of the line, means such as a gas tube is connected in series with each of the ringers, the gas tubes at the first and second stations being poled oppositely to each other. A ringing voltage supply comprising a low frequency voltage source connected in series with a direct current source is connectible to the line. By providing oppositely biased ringing voltage supplies and apparatus for selectively connecting the supplies to the line conductor, selective operation of the ringers can be achieved.

When a signaling supply of this nature is to be located at a point such as a line concentrator or a pole-mounted subscriber line carrier termination, remote from a source of direct current, the matter of supplying biasing voltages becomes a problem. For instance, while oppositely poled batteries can be used, batteries are bulky and expensive and require considerable maintenance. The substitution of dry-plate rectifiers driven from a commercial alternating current power source for batteries overcomes the maintenance problem. However, the problem of expense remains because separate rectifiers or a single rectifier with switching equipment must be provided in order to be able to supply both positive and negative biased signaling current.

Therefore, it is an object of my invention to provide a new and improved signaling power supply.

Another object of my invention is to provide a new and improved signaling power supply suitable for use in a telephone system.

Another object of my invention is to provide a new and improved power supply which is selectively operable to deliver either positive or negative voltage.

Another object of my invention is to provide a new and improved signaling power supply suitable for use in a telephone system capable of delivering both positively and negatively biased alternating signaling voltages.

Another object of my invention is to provide a new and improved power supply suitable for use in a telephone system selectively operable to deliver either positively or negatively biased alternating signaling voltages and which is suited to installations remote from attended equipment and sources of direct current.

I accomplish these and other objects by providing a system having a source of alternating current power which is to be rectified and delivered to a load. To this end, I provide means including a pair of unidirectional conductive devices, such as controlled rectifiers, for coupling the power source to the load. The unidirectional devices are connected in parallel and poled oppositely to each other. Each unidirectional device has a gate or control element, the device being made conductive in the forward direction in response to the application of a signal to its control element.

In order to selectively energize one or the other of the unidirectional devices, I provide a source of signals and switching means having first and second output conductors connected to the control element of the first and second unidirectional devices, respectively. The switching means is selectively operable in first and second manners under the control of remotely located apparatus to connect the signal source to the first and second switching means output conductors, respectively. By this means, direct current power of first and opposite polarities is applied to the load under the directive control of the remotely located apparatus.

For convenience, I make reference in the following description to the drawing attached to and forming a part of the present specification. The drawing shows a schematic diagram of a power supply system including a rectifier, a load, and a switch unit as well as a skeletonized representation of a signal repeater and a block diagram of signaling apparatus.

The preferred embodiment of my invention is particularly suited to be used in pole-mounted subscriber line carrier equipment which is to be located where commercial 60 cycle power is available and remote from a telephone central office. In addition to the 60 cycle power source, the system includes generator GR10 which is operative for producting low frequency signals suited to drive alternating current responsive, telephone type ringers.

The 60 cycle power source is connected to the left-hand winding of input transformer L10 within converter 10, which is used to rectify power from the 60 cycle source in the manner next set forth. The right-hand winding of the transformer is center tapped to ground, its upper and lower terminals being connected to the converter 10 output and the load by first and second pairs of controlled rectifiers (RCT10—RCT11 and RCT12—RCT13). The rectifiers in each pair are connected in parallel and poled oppositely to each other. The positive plates of rectifiers RCT10 and RCT12 and the negative plates of rectifiers RCT11 and RCT13 are connected together and to the output of converter 10. Rectifiers RCT10, RCT11, RCT12 and RCT13 are normally nonconductive in the forward direction when voltage from the 60 cycle source is applied across their positive and negative plates.

The output of converter 10 is connected to the left-hand terminal of the lower winding of coupling transformer L12. Generator GR10 is connected to the upper winding of coupling transformer L12. The amplitude of the 60 cycle voltage measured between each of the terminals and the center tap of the right-hand winding of transformer L10 is greater than the amplitude of generator GR10 signals induced in the lower winding of transformer L12, so that when converter 10 is operating in the manner to be described, the generator GR10 signals induced in the lower winding of transformer L12 are superimposed on the direct voltage produced at the output of converter 10. The combined signal is applied to the load through low pass filter 14 and the lower conductor of line SL10.

The aforementioned load includes ringers such as RG10 and RG11 connected between the lower conductor of line SL10 and ground by unidirectionally conductive means including gas tubes GT10 and GT11, respectively. Tubes GT10 and GT11 are oppositely poled with respect to each other, so that the application of the positively or negatively biased signal to both series combinations of gas tubes and ringer is effective for causing the one of the tubes poled to agree with the bias of the combined signal to conduct and therewith apply the alternating current component of the signal to the series connected ringer. Thus, when positively or negatively biased signals are applied to the lower conductor of line SL10, ringer RG10 or RG11, respectively, operates.

Returning to the consideration of converter 10, when like-poled rectifiers RCT10 and RCT12 are made conductive in the forward direction, converter 10 functions as a full-wave rectifier and is effective for producing a negative voltage component of the combined signal applied to ringers RG10 and RG11. Similarly, when like-poled rectifiers RCT11 and RCT13 are made conductive in the forward direction, converter 10 operates as a full-wave rectifier for producing a positive component of the aforementioned combined signal. The apparatus for controlling conductivity in rectifiers RCT10, RCT11, RCT12 and RCT13 is next described.

Each of rectifiers RCT10, RCT11, RCT12 and RCT13 has a control electrode or gate and is made operative in response to the application of a signal thereto which is positive with respect to the voltage present on the negative plate to conduct in the forward direction (from positive to negative) between its plates. The gates of like-poled rectifiers RCT10 and RCT12 are connected together, as are the gates of like-poled rectifiers RCT11 and RCT13. With this arrangement, when the upper and lower terminals of the right-hand winding of transformer L10 swing negative with respect to the center tap ground, and a ground signal is applied to the gates of rectifiers RCT10 and RCT12, those rectifiers become conductive in their forward direction and the direct component of the voltage applied to the load including ringers RG10 and RG11 is negative with respect to ground. Similarly, when the upper and lower ends of the right-hand winding of transformer L10 become positive with respect to ground and a ground signal is applied to the gates of rectifiers RCT11 and RCT13, rectifiers RCT11 and RCT13 become conductive in their forward directions and the direct component of the voltage applied to the load is positive with respect to ground.

In order to directively operate converter 10, I provide switching means comprising repeater 13 and switch 11. Switch 11 is provided with first and second output conductors connected to the conduction control elements of similarly poled rectifiers RCT10—RCT12 and RCT11—RCT13, respectively. Switch 11 is arranged to be operated in first and second manners in response to the directive signals from repeater 13. Repeater 13 in turn is controlled by signals transmitted thereto over channel CH10 from signaling apparatus 12 remote from converter 10 and switch 11. Both repeater 13 and signaling apparatus 12 may be of any of a number of types well known to those skilled in the telephone art. Because signaling apparatus 12 and repeater 13 do not of themselves form the present invention, their operation is not described in detail.

Repeater 13 is normally effective for causing means such as break contacts CT11 to transmit a negative signal to the signal input of switch 11 through resistor R16. Repeater 13 is operative in response to the receipt of a signal from control apparatus 12 to open the break contacts CT11 and thereby substitute a ground (positive) signal through resistor R17 for the signal, with effects which are next described.

The normal, negative signal from repeater 13 applied to the input of switch 11 is effective for maintaining switch 11 in a first of two conditions by maintaining the base of PNP type transistor TR10 negative with respect to its emitter. For this reason, transistor TR11 is normally maintained in hard-conduct condition between its emitter and collector. The collector of transistor TR11 is connected to a first output conductor of switch 11 which in turn is connected to the gates of rectifiers RCT10 and RCT12. The ground signal source connected to the gates of rectifiers RCT10 and RCT12 is effective in the previously described manner to make those rectifiers conductive in the forward direction in order to apply negatively biased ringing signals to the conductor of line SL10. The collector of transistor TR11 also is directly coupled to the base of PNP type transistor TR10. When transistor TR11 is in hard-conduct condition between its emitter and collector the base of transistor TR10 is made positive with respect to its emitter, so that transistor TR10 is not conductive between its emitter and collector, and consequently, a ground signal is withheld from the second output conductor of switch 11.

Switch 11 is operated in a second manner when the ground signal is substituted for the negative signal on the switch output to make the base of transistor TR11 positive with respect to its emitter. Consequently, transistor TR11 no longer conducts between its emitter and collector and effectively disconnects the signal source from the first output conductor of switch 11 and the gates of rectifiers RCT10 and RCT12. Rectifiers RCT10 and RCT12 are shut off. As a further result, the positive signal previously applied to the base of transistor TR10 is now removed. The base of transistor TR10 therefore becomes negative with respect to its emitter and transistor TR10 becomes conductive between its emitter and collector, thereby connecting the ground signal source to the second output conductor of switch 11 and to gates of rectifiers RCT11 and RCT13 which are connected thereto. Rectifiers RCT11 and RCT13 are now conductive in the forward direction, so that the aforementioned combined signal applied to the line SL10 conductor is positively biased.

Switch 11 can continue to be operated indefinitely in the first and second manners to direct converter 10 to produce positively and negatively biased signals at its output. In this manner, selective operation of ringers RG10 and RG11 under the directive control of remotely located signaling apparatus 12 is achieved.

While I have shown and described the preferred embodiment of my invention, other changes and modifications in my device will readily occur to those skilled in the art. I therefore aim in the appended claims to cover all such changes and modifications as fall within the true spirit and scope of my invention.

What I claim is:

1. In a power supply system, first and second alternating current power sources, said first power source having a potential of greater amplitude than said second power source, a load, first and second parallel connected oppositely poled unidirectionally conductive devices each having a conduction control element, means including said devices for serially coupling said first and second power sources and said load, a source of control signals, switching means coupled to said source of control signals and having first and second switch positions, first and second output leads from said switching means connected to the conduction control elements of said first and second devices, respectively, and said switching means selectively applying a signal to a selected one of said output leads in response to the receipt of a predetermined control signal from said source of control signals, whereby alternating voltage from said second source, superimposed on direct voltage of opposite polarities and derived from said first power source, is applied to said load in response to said switching means being operated to said first and second switch positions, respectively.

2. In a power supply system, first and second alternating current power sources, the potential of said first power source having a substantially greater amplitude than said second source, a load, first and second parallel connected oppositely poled rectifiers each having a conduction control terminal, means including said rectifiers for serially coupling said first and second power sources and said load, a source of control signals independent of either of said power sources, switching means coupled to said source of control signals and having first and second output leads connected to said conduction control terminals of said first and second rectifiers, respectively, and said switching means having first and second switch positions for applying a signal from said signal source to a selected one of said output leads, whereby alternating potential from said second source, superimposed on direct potential of first and second opposite polarities and derived from said first power source, is applied to said load in response to said switching means being operated to said first and second switch positions, respectively.

3. In a power supply for a telephone system, first and second alternating current power sources, said first power source having first and second terminals and a center tap and having a potential greater than said second power source, a load including biased ringers connected to the conductor of a telephone line, first and second pairs of parallel connected oppositely poled rectifiers each having a conduction control terminal, means including said first and second pairs of rectifiers for coupling said load across said center tap and said first and second terminals, switching means having first and second switch positions, first and second output leads from said switching means, said switching means applying a predetermined signal to a selected one of said output leads in response to a predetermined signal from said source of control signals, said first and second output leads connected to said conduction control terminals of said first and second rectifiers in said first pair of rectifiers, respectively, said conduction control terminals of the poled-alike devices from said first and second pairs of rectifiers connected together, a source of control signals remote from said switching means and coupled thereto by a signaling channel for selectively operating said switching means to said first and second switch positions, whereby alternating potential from said second power source, superimposed on direct potential of first and second opposite polarities derived from said first power source, is applied to said load in response to said switching means being operated to said first and second switch positions, respectively, by said control signals.

References Cited in the file of this patent

UNITED STATES PATENTS

| | | |
|---|---|---|
| 1,612,019 | Holden | Dec. 28, 1926 |
| 2,268,880 | Kusche | Jan. 6, 1942 |
| 2,458,937 | Glass | Jan. 11, 1949 |
| 2,823,266 | Trousdale | Feb. 11, 1958 |
| 2,831,113 | Weller | Apr. 15, 1958 |
| 2,939,919 | Bonner et al. | June 7, 1960 |